Nov. 17, 1953     R. A. CRAMER     2,659,100

CASTER

Filed April 12, 1951

INVENTOR.
Roy A. Cramer
BY
Fishburn & Mullendore
ATTORNEYS

Patented Nov. 17, 1953

2,659,100

UNITED STATES PATENT OFFICE 2,659,100

CASTER

Roy A. Cramer, Kansas City, Mo.

Application April 12, 1951, Serial No. 220,689

8 Claims. (Cl. 16—22)

1

This invention relates to casters generally, and more particularly to a swivel caster especially designed for use on chairs, tables, or other articles of similar nature.

The principal objects of my invention are to provide an antifriction caster easily attached to the legs of chairs or other articles and be frictionally retained therein, and a considerable portion of which may be stamped from sheet metal to provide for economy in manufacture, simple and efficient in operation; to provide a housing for the caster having bearing portions for the shaft of the caster wheel; to provide radial needle bearings for the pintles engaging in the leg of the articles to which the casters are attached; and to provide a device of this character easily assembled and disassembled from the chair or other article.

In accomplishing these and other objects of the present invention hereinafter pointed out, I have provided improved detail of structure, the preferred form of which is illustrated in the accompanying drawings, wherein.

Figure 1:
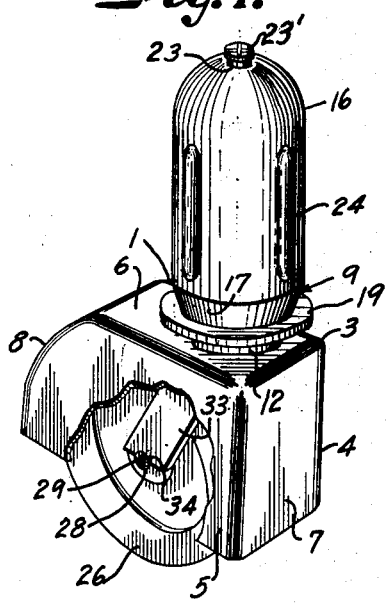
Fig. 1 is a perspective view of my caster with parts broken away to better illustrate the invention.

Referring more in detail to the drawings:

1 designates a caster embodying the features of my invention adapted to be inserted in the hollow leg 2 of a chair or the like. The device consists of a sheet metal housing 3 having sides 4 and 5, a top 6, a forward substantially flat face 7 and a rear curved end 8.

A pintle 9 is provided for engagement in the hollow cylindrical leg member 2 and comprises a pin or bolt 10 extending vertically above an opening 11 in the top 6 of the housing 3. The pin 10 has a collar 12 near the lower end of the pin which engages on top of the housing and a sleeve 13 engages around the pin 10 the inner side of which provides a bearing surface for a plurality of roller or needle bearings 14 extending longitudinally of the pin 10. The pin 10 is offset as indicated at 14' providing a shoulder for supporting the lower ends of the roller bearings and the space between the sleeve and bolt provides a raceway for said bearings. The upper portion of the sleeve 13 is tapered or dome shaped as indicated at 15.

2

Adapted to engage over the sleeve 13 is a cylindrical housing 16 provided on its lower end with an inwardly tapering portion 17 which engages in an annular recess 18 on the sleeve 13 to resiliently retain the housing on the sleeve. The lower end of the sleeve 13 terminates in an annular flange 19 upon which the lower end 20 of the leg is adapted to seat when the caster is in place. The upper end of the pin 10 is reduced providing a shank 21 extending through opening 22 in the top of the sleeve and through opening 23 in the top of the housing 16. The outer end of the shank is peened providing a head 23' for retaining the housing 16 and sleeve 13 in assembled relation with the pin 10 and retaining the roller bearings in place in the raceway between the sleeve and pin. The housing 16 is provided with a plurality of vertical ribs 24 around its outer periphery for engaging the inner wall 25 of the leg 2 of the chair or the like for frictionally retaining the pintle of the caster in the leg.

A roller 26 is provided for the caster preferably made of hard rubber, plastic or the like, and is adapted to engage within the housing 3. The roller is provided through substantially the center thereof with a bushed opening 27 adapted to receive a shaft 28 having its ends tapered as indicated at 29, for a purpose presently indicated. The sides 4 and 5 of the housing 3 are provided with outstruck portions or recesses 30 forming bearings for the tapered ends 29 of the shaft 28 and to retain the rollers within the housing.

The pin 10 is reduced at its lower end providing a shank 31, and secured within the housing 3 and engaging the shank 31 is a U-shaped bracket member 32 having downwardly extending arms 33 provided with recess portions 34 in the extreme lower ends thereof and adapted to engage the upper side of the shaft 28 of the roller when the roller is housed within the housing 3 and to provide bearings to take the thrust from the shaft of the roller when the chair is in use. The cross arm of the U-shaped bracket 32 has an opening 35 and the lower end of the shank 31 extends therethrough and is peened to hold the bracket thereon.

In assembling a device constructed as described, the needle bearings are assembled on the pin 10 and the sleeve 13 placed thereover. The housing 16 is then inserted over the sleeve with the shank 21 of the pin extending through the openings 22 and 23 in the top of the sleeve 13 and housing 16, respectively, and the end peened providing a head 23' to hold the parts of the pintle in assembled relation. The shank 31 of the pin 10 is inserted through the opening 35 in the bracket 32 and the lower end peened providing a head 36 to secure the housing 3 and bracket 32 to the pin 10.

Figure 2:
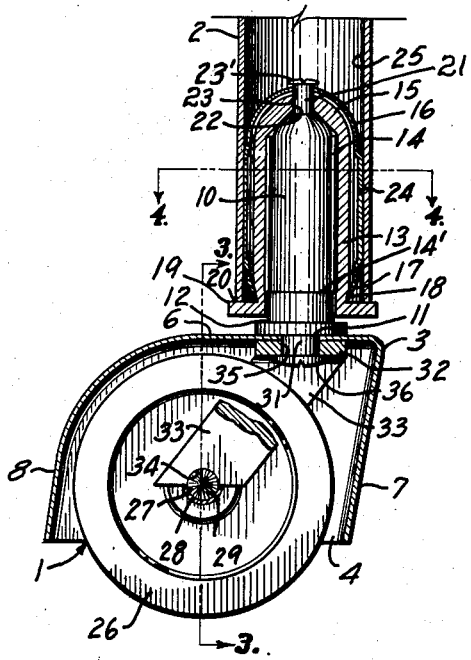
Fig. 2 is a vertical sectional view through the caster shown attached to the leg of a chair.
Figure 3:
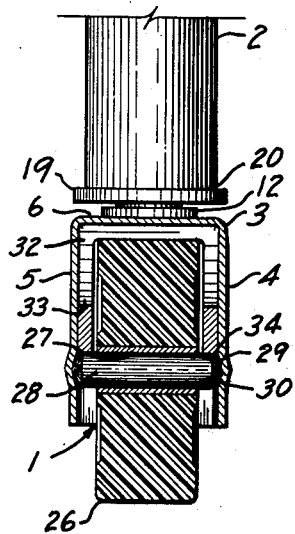
Fig. 3 is a vertical section taken on a line 3—3, Fig. 2, particularly illustrating the bearing portion of the caster wheel.
Figure 4:
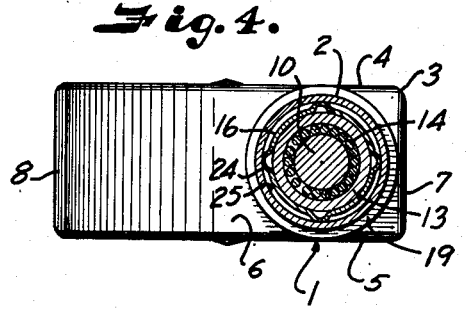
Fig. 4 is a cross sectional view taken on a line 4—4, Fig. 2.

The housing 3 is made of sheet material which has some resiliency and the roller 26 is then inserted within the housing with the shaft 28 pressed therein so that when the ends 29 engage the bearing recesses 30 the shaft will be retained therein in bearing relation. At the same time the lower end of the U-shaped bracket member 32 engages the shaft to take the thrust from the roller when the roller is in use. The pintle is then inserted within the lower end of the hollow leg 2 until the lower edge thereof rests against the flange 19, as best illustrated in Fig. 2. The ribs 24 engage the inner wall of the leg to frictionally hold the pintle within the leg.

It will be obvious from the foregoing that I have provided an improved caster which may be frictionally held in the end of a hollow cylindrical member such as a chair or the like and which will freely swivel and is easily assembled and disassembled.

What I claim and desire to secure by Letters Patent is:

1. In a caster, a housing having side walls, the inner walls of which are provided with aligned recesses forming bearings, a wheel disposed in said housing, a shaft extending through the wheel, said shaft having tapered ends engaging in said bearing recesses of the sides of said housing, said side walls being resilient for insertion of the shaft in the bearing recesses and retaining said wheel in said housing, and means in said housing engaging said shaft for receiving the thrust of said wheel when in use.

2. In a caster, a housing having a top wall and side walls, the inner walls of which are provided with aligned recesses forming bearings, a wheel disposed in said housing, a shaft extending through the wheel, said shaft having tapered ends engaging in said bearing recesses of the sides of said housing, a pintle for engaging in a cylindrical opening of a chair leg or the like, said pintle including a pin extending vertically through the top wall of said housing, a sleeve surrounding said pin and spaced therefrom forming a raceway, roller bearings in said raceway, a housing for said sleeve, and means on said sleeve housing for engaging the inner wall of said cylindrical leg for frictionally retaining said pintle therein.

3. In a caster, a housing having a top wall and side walls, the inner walls of which are provided with aligned recesses forming bearings, a wheel disposed in said housing, a shaft extending through the wheel, said shaft having tapered ends engaging in said bearing recesses of the sides of said housing, a pintle for engaging in a cylindrical opening of a chair leg or the like, said pintle including a pin extending vertically through the top wall of said housing, a sleeve surrounding said pin and spaced therefrom forming a raceway, roller bearings in said raceway, a housing for said sleeve, and vertical ribs on said sleeve housing for engaging the inner wall of said cylindrical leg for frictionally retaining said pintle therein.

4. In a caster, a housing having a top wall and side walls, a wheel disposed in said housing, a shaft extending through the wheel, means in said housing engaging said shaft for retaining the wheel in said housing, a pintle for engaging in a cylindrical opening of a chair leg or the like, said pintle including a pin extending vertically through the top wall of said housing, a sleeve surrounding said pin and spaced therefrom forming a raceway, roller bearings in said raceway, a housing for said sleeve, means on said sleeve housing for engaging the inner wall of said cylindrical leg for frictionally retaining said pintle therein, and means for retaining said pin, sleeve and sleeve housing in assembled relation.

5. In a caster, a housing having a top wall and side walls, the inner walls of which are provided with aligned recesses forming bearings, a wheel disposed in said housing, a shaft extending through the wheel, said shaft having tapered ends engaging in said bearing recesses of the sides of said housing, a pintle for engaging in a cylindrical opening of a chair leg or the like, said pintle including a pin extending vertically through the top wall of said housing, a sleeve on said pin and spaced therefrom forming a raceway, roller bearings in said raceway, a housing for said sleeve, means on said sleeve housing for engaging the inner wall of said cylindrical leg for frictionally retaining said pintle therein, means for retaining said pin, sleeve and sleeve housing in assembled relation, and a U-shaped bracket engaged by the pin in said first named housing and rigidly holding the same therein, said bracket having depending arms and the lower ends of said arms having recesses forming bearings for said wheel shaft to take part of the thrust of said wheel.

6. In a caster, a housing having a top wall and side walls, the inner walls of which are provided with aligned recesses forming bearings, a wheel disposed in said housing, a shaft extending through the wheel, said shaft having tapered ends engaging in said bearing recesses of the sides of said housing, a pintle for engaging in a cylindrical opening of a chair leg or the like, said pintle including a pin extending vertically through the top wall of said housing, a sleeve on said pin and spaced therefrom forming a raceway, roller bearings in said raceway, a housing for said sleeve, vertical ribs on said sleeve housing for engaging the inner wall of said cylindrical leg for frictionally retaining said pintle therein, means for retaining said pin, sleeve and sleeve housing in assembled relation, and a U-shaped bracket engaged by the pin in said first named housing and rigidly holding the same therein, said bracket having depending arms and the lower ends of said arms having recesses forming bearings for said wheel shaft to take part of the thrust of said wheel.

7. In a caster, a housing having a top wall and side walls, the inner walls of which are provided with aligned recesses forming bearings, a wheel disposed in said housing, a shaft extending through the wheel, said shaft having tapered ends engaging in said bearing recesses of the sides of said housing, a pintle for engaging in a cylindrical opening of a chair leg or the like, said pintle including a pin extending vertically through the top wall of said housing, a sleeve on said pin and spaced therefrom forming a raceway, roller bearings in said raceway, a housing for said sleeve, vertical ribs on said sleeve housing for the inner wall of said cylindrical leg for frictionally retaining said pintle therein, the upper end of said pin having a reduced portion forming a shank, the upper ends of said sleeve and sleeve housing having openings through which said shank extends, means on the end of said shank for retaining said pin, sleeve and sleeve housing in assembled relation, and a U-shaped bracket engaged by the pin in said first named housing and rigidly holding the same therein, said bracket having depending arms and the lower ends of said arms having recesses forming bearings for said wheel shaft to take part of the thrust of said wheel.

8. In a caster, a housing having a top wall and side walls, the inner walls of which are provided with aligned recesses forming bearings, said housing having an opening in the top wall thereof, a wheel disposed in said housing, a shaft extending through the wheel, said shaft having tapered ends engaging in said bearing recesses of the sides of said housing, a pintle for engaging in a cylindrical opening of a chair leg or the like, said pintle including a pin extending vertically through the opening in the top wall of said housing, a collar on said pin engaging the top wall of said housing, a sleeve on said pin and spaced therefrom forming a raceway, roller bearings in said raceway, a housing for said sleeve, vertical ribs on said sleeve housing for engaging the inner wall of said cylindrical leg for frictionally retaining said pintle therein, the upper end of said pin having a reduced portion forming a shank, the upper ends of said sleeve and sleeve housing having openings through which said shank extends, means on the end of said shank for retaining said pin, sleeve and sleeve housing in assembled relation, and a U-shaped bracket in said first named housing having a cross arm provided with an opening, said pin having a reduced lower end forming a shank extending through the opening in said cross arm and through the opening in the first named housing, and means on the end of the last named shank for rigidly holding the bracket in said housing, said bracket having depending arms and the lower ends of said arms having recesses forming bearings for said wheel shaft to take part of the thrust of said wheel.

ROY A. CRAMER.

References Cited in the file of this patent

UNITED STATES PATENTS

| Number | Name | Date |
|---|---|---|
| 474,576 | Cutter | May 10, 1892 |
| 1,864,933 | Pynynski | June 28, 1932 |
| 1,892,845 | McGrath | Jan. 3, 1933 |
| 2,170,257 | Andersen | Aug. 22, 1939 |

FOREIGN PATENTS

| Number | Country | Date |
|---|---|---|
| 2,824 | Great Britain | of 1885 |
| 5,447 | Switzerland | Aug. 2, 1892 |
| 440,250 | Great Britain | Dec. 23, 1935 |